(12) United States Patent
Brooks et al.

(10) Patent No.: US 6,829,413 B2
(45) Date of Patent: Dec. 7, 2004

(54) FERRULE-LESS OPTICAL FIBER APPARATUS FOR OPTICAL BACKPLANE CONNECTOR SYSTEMS

(75) Inventors: Cameron J. Brooks, Elmsford, NY (US); Philip G. Emma, Danbury, CT (US); Casimer M. DeCusatis, Poughkeepsie, NY (US); Lawrence Jacobowitz, Wappingers Falls, NY (US); John U. Knickerbocker, Wappingers Falls, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 10/307,951

(22) Filed: Dec. 2, 2002

(65) Prior Publication Data

US 2004/0105648 A1 Jun. 3, 2004

(51) Int. Cl.[7] .............................. G02B 6/26; G02B 6/42
(52) U.S. Cl. ............................ 385/31; 385/50; 385/63
(58) Field of Search ......................... 385/31, 32, 34, 385/42, 47, 59, 63, 50; 439/31, 32, 34, 42, 47, 59, 63, 50

(56) References Cited

U.S. PATENT DOCUMENTS

| | | | |
|---|---|---|---|
| 4,130,345 A | * 12/1978 | Doellner | 385/44 |
| 4,176,908 A | * 12/1979 | Wagner | 385/47 |
| 4,306,765 A | * 12/1981 | Winzer et al. | 385/47 |
| 4,890,894 A | 1/1990 | Kwa | 385/56 |
| 5,204,925 A | 4/1993 | Bonanni et al. | 385/89 |
| 5,253,318 A | * 10/1993 | Sayegh et al. | 385/114 |
| 5,390,266 A | * 2/1995 | Heitmann et al. | 385/44 |
| 5,671,316 A | 9/1997 | Yuhara et al. | 385/137 |
| 5,784,509 A | 7/1998 | Yamane et al. | 385/49 |
| 5,793,919 A | 8/1998 | Payne et al. | 385/135 |
| 6,005,991 A | 12/1999 | Knasel | 385/14 |
| 6,115,522 A | * 9/2000 | Tachikura et al. | 385/102 |
| 6,229,942 B1 | 5/2001 | Engberg et al. | 385/39 |
| 6,272,271 B1 | 8/2001 | Wojnarowski et al. | 385/52 |
| 6,282,352 B1 | 8/2001 | Kato et al. | 385/92 |
| 6,304,690 B1 | 10/2001 | Day | 385/24 |
| 6,341,185 B1 | * 1/2002 | Elster et al. | 385/12 |
| 6,352,372 B1 | * 3/2002 | Shahid | 385/59 |
| 6,516,107 B1 | * 2/2003 | Gardner et al. | 385/16 |
| 6,519,382 B1 | * 2/2003 | Jurbergs et al. | 385/18 |

* cited by examiner

*Primary Examiner*—Hae Moon Hyeon
(74) *Attorney, Agent, or Firm*—James J. Cioffi; Cantor Colburn LLP

(57) ABSTRACT

A ferrule-less optical backplane connector assembly includes a substrate having at least a pair of optical guide receiving structures formed therein, the pair of optical guide receiving structures further being formed at substantially a right angle with respect to one another so as to guide a corresponding first and second optical guide into optical alignment with one another.

27 Claims, 5 Drawing Sheets

FERRULE-LESS OPTICAL FIBER APPARATUS FOR OPTICAL BACKPLANE CONNECTOR SYSTEMS

BACKGROUND

The present invention relates generally to optical interfaces for data communication and, more particularly, to a ferrule-less optical fiber apparatus for optical backplane connector systems.

There are many well-recognized benefits of using optical fiber to replace copper wiring for printed circuit boards (PCBs) in computer and networking equipment. Such potential benefits include increased bandwidth and data rate, overcoming bottlenecks in the processing architecture, immunity to electromagnetic interference and reductions in radiated noise from the system, reduced latency by elimination of optical/electrical (OLE) conversions, more dense packaging at lower cost per pin, and enablement of new processor interconnect technologies such as meshed rings. These and other factors directly contribute to the performance of the computer system (e.g., increased processing power in MIPS (million instructions per second) or FLOPS (floating-point operations per second), increased node count in parallel architectures, etc.).

However, in order to fully realize these benefits, an optical fiber interconnect should also continue to provide the same benefits of the existing electrical connection technologies. Heretofore, this issue has been one of the inhibitors to widespread use of optical fiber connection technology. As compared with copper interconnects, optical interconnects tend to require fairly high-precision, costly, and difficult to assemble components that are not particularly "user friendly" to field technicians lacking specific training in fiber optics.

For example, conventional duplex fiber optic connectors such as the SC (manufactured by IBM and Siecor) and ST (by AT&T) employ very precise ceramic ferrules and alignment sleeves to provide a means for bringing two optical fiber end faces into physical contact with one another. Actual physical contact is implemented in order to avoid excessively high optical losses, unwanted reflections, and other forms of noise. As such, a spring-loaded connector with some degree of float is used to facilitate the alignment of the fibers. Other types of multifiber ferrules have been proposed, such as the 12-fiber MT (manufactured by Fujikura, Siecor and AMP and others), which can be made of thermoplastic materials and employ precision stainless steel pins and a guide hole to achieve alignment of the fiber array. Unfortunately, both of these connector designs are inherently expensive, because the precision required for either ceramic ferrules or MT guide pins is on the order of a few microns to submicron dimensions.

Furthermore, despite the fact that ferrules are produced by the millions, the basic high-volume price thereof has not changed significantly over the years. The ceramic parts alone in a duplex connector can cost around $6, while MT ferrule components themselves can run into the $10–20 range. The metal springs used to maintain physical contact between fibers and related elements in the connector further increase the cost. In addition, the process of threading an optical fiber (e.g., having an outer diameter of about 125±1 microns) into a precision hole (e.g., having a maximum diameter less than 127 microns) has traditionally been a very difficult process to automate using factory-terminated, ferrule-based connectors. While field termination is possible for duplex connectors, it is not an option for multi-fiber connectors. Moreover, even where epoxy-free field terminations are used, it can still take 5–10 minutes (or even longer) to field terminate a duplex fiber connector (as compared to 1–2 minutes for a category-5 UTP copper connector), thereby further increasing the overall installation costs.

Accordingly, it would be desirable to be able to implement a fiber optic connector for multi-fiber, parallel backplane interfaces that provides the benefits of both optical fiber technology and the copper interconnect interfaces currently in use.

SUMMARY

The foregoing discussed drawbacks and deficiencies of the prior art are overcome or alleviated by a ferrule-less optical backplane connector assembly. In an exemplary embodiment, the assembly includes a substrate having at least a pair of optical guide receiving structures formed therein, the pair of optical guide receiving structures further being formed at substantially a right angle with respect to one another so as to guide a corresponding first and second optical guide into optical alignment with one another.

In another aspect, a ferrule-less optical backplane connector apparatus includes a laminate assembly having a plurality of V-shaped grooves formed within individual layers thereof. The V-shaped grooves are formed at substantially right angle pairs with respect to one another, and are configured for guiding and optically coupling a corresponding pair of optical guides inserted within orthogonal sides of the laminate assembly.

In yet another aspect, a method for forming a ferrule-less optical backplane connector assembly includes forming orthogonally intersecting pairs of V-shaped grooves within a plurality of workpieces. An index-matching fluid is inserted within each pair of the V-shaped grooves. Then, the plurality of workpieces are stacked and bonded to form a generally cube-shaped, laminate assembly. The pairs of V-shaped grooves in individual layers of the laminate assembly are vertically aligned so as to receive arrays of optical guides within orthogonal sides of the assembly.

BRIEF DESCRIPTION OF THE DRAWINGS

Referring to the exemplary drawings wherein like elements are numbered alike in the several Figures.

DETAILED DESCRIPTION

Figure 1:
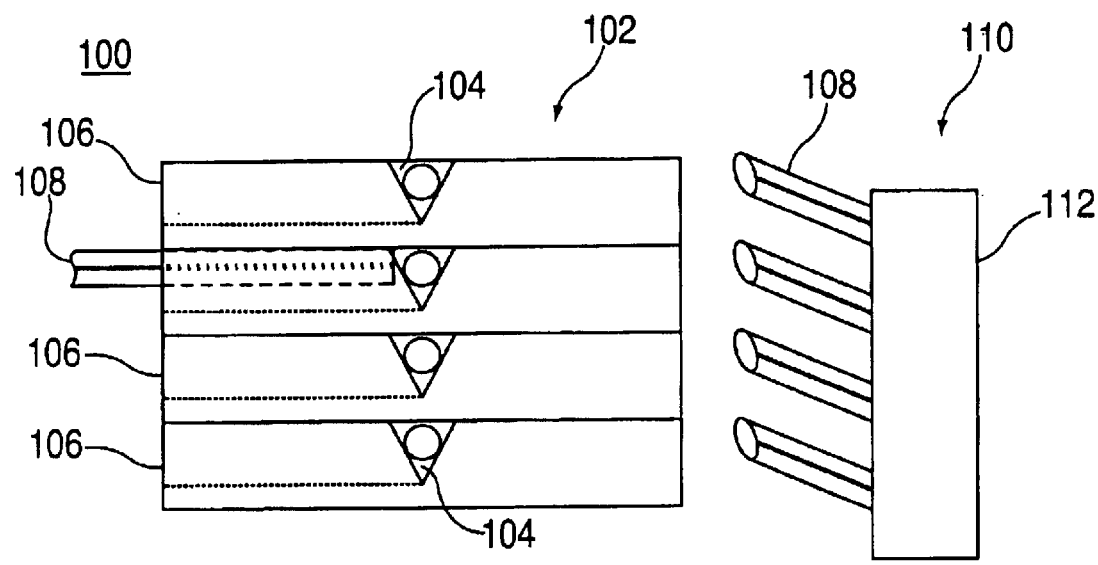
FIG. 1 is a side view of a ferrule-less optical fiber connector apparatus, suitable for use in optical backplane connector systems, in accordance with an embodiment of the invention.

Referring initially to FIG. 1, there is shown a ferrule-less optical connector apparatus 100, suitable for use in optical backplane connector systems, in accordance with an embodiment of the invention. The apparatus 100 includes a stacked silicon laminate assembly 102 having a plurality of optical receiving guides, embodied in FIG. 1 as V-shaped grooves 104 formed within each successive layer 106 of the laminate assembly 102. Each groove 104 may be formed within the silicon laminate assembly 102 by techniques such as etching, and is configured to receive an individual optical guide (e.g., an optical fiber 108) inserted therein. It will be noted that the optical fiber 108 is inserted within an individual groove 104 without the use or presence of a ferrule or other cylindrical plug attached thereto. Rather, the optical fiber 108 is essentially cantilevered in free space prior to insertion into the laminate assembly 102, and wherein alignment is provided by V-shaped grooves 104 themselves.

Particularly, a suitable flatness of the V-shaped grooves 104 is produced by preferential etching of selected planes in silicon to submicron tolerances, and is thus sufficient for both multimode fiber (e.g., having about a 50 or 62.5 micron core diameter) and single mode fiber (e.g., having about a 9 micron core diameter). The optical guide receiving structures, embodied by V-shaped grooves 104 on one of the axes (sides) of the laminate assembly 102, may also be replaced with slab waveguides in either multimode (e.g., dimensions on the order of tens of microns dimensions) or single mode (e.g., dimensions on the order of less than 10 microns) with rectangular cross-sections.

Alternatively, the V-shaped grooves 104 may also be formed by injection molding tools, using a triangular piece of metal ground to the desired flatness. In addition, common tolerances for small plastic parts presently manufactured are on the order of about ±75 microns, and would thus be sufficient for multimode fiber or waveguide alignment and, possibly for single mode techniques with future incremental process improvements.

As can also be seen from FIG. 1, the grooves 104 of the laminate assembly 102 may be aligned in a vertical or stacked manner to accommodate a plurality of optic interconnects, such as a fiber ribbon 110, wherein a plurality of fibers 108 are cantilevered from a rigid plug body 112. Accordingly, the fiber ribbon 110 will flex as a unibody structure, with each of the fibers 108 generally moving in unison. Moreover, the ribbon 110 behaves much the same as a thin polymer sheet and is thus resistant to buckling out of the alignment plane under these forces. As will be described in greater detail hereinafter, upon insertion into the corresponding V-shaped grooves 104, the ribbon fibers 108 are initially straight. Thereafter, the ribbon fibers come into contact with the 45 degree (or similarly angled) surfaces of the V-grooves 104 which guide the plug fiber to slide into physical and contact with a corresponding mating fiber. Thus disposed, the fiber ribbon 110 has a slight bend that provides the spring force to retain the fiber connection.

Figure 2:
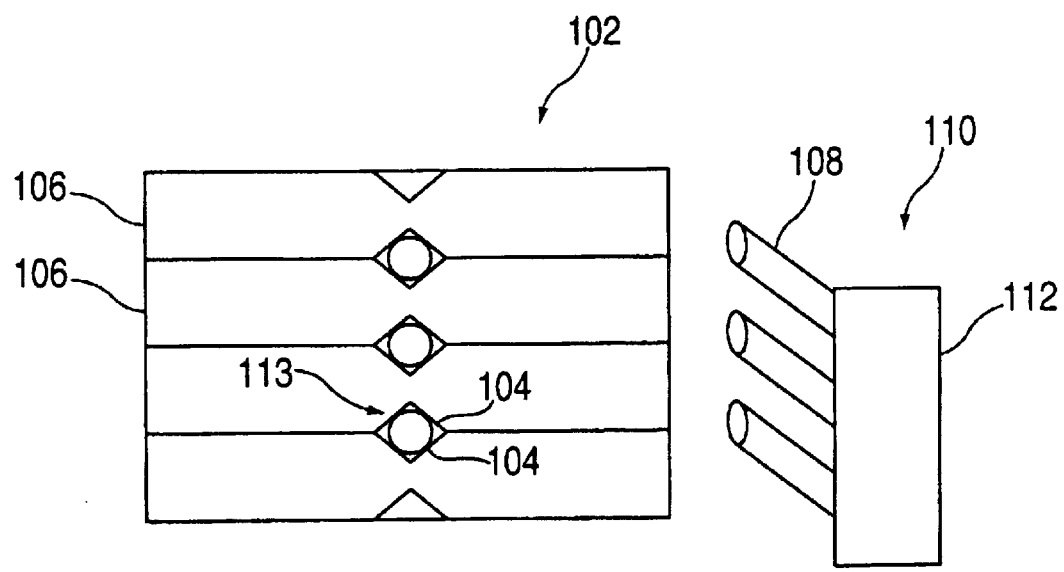
FIG. 2 illustrates an alternative embodiment of the laminate assembly shown in FIG. 1.
Figure 3:
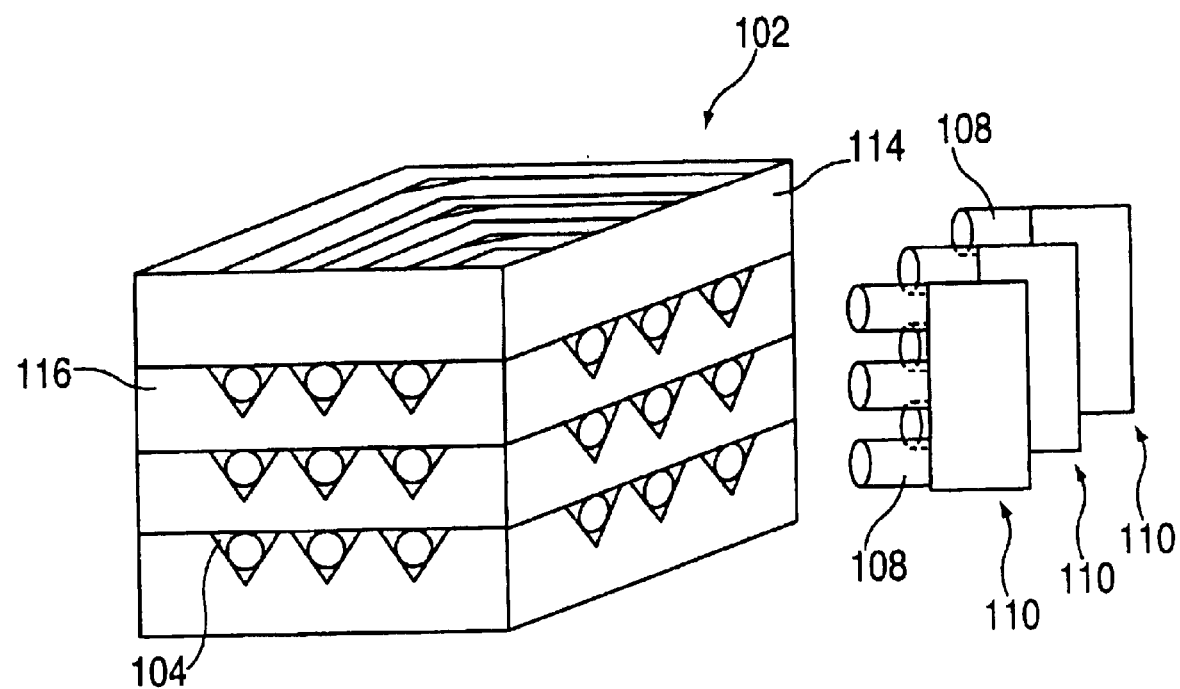
FIG. 3 is a perspective of the laminate assembly shown in FIG. 1.

FIG. 2 illustrates an alternative embodiment the laminate assembly 102 (also referred to hereinafter as a "cube structure") of FIG. 1. In this embodiment, the middle layers 106 of the assembly include a pair of opposing V-shaped grooves 104 such that, when stacked upon an adjacent layer, a diamond shaped, double V-shaped groove 113 is formed. However, in either embodiment, it will be appreciated that the three-dimensional laminate assembly 102 is particularly suited for a three-dimensional, orthogonal connection system for multiple numbers of interconnects, as shown in the perspective view of FIG. 3. Here, a plurality of parallel, fiber optic ribbons 110 may be plugged into one side 114 of the stacked laminate cube structure 102 for orthogonal optic coupling to a plurality of corresponding fibers (not shown) plugged into another side 116 (orthogonal to side 114) of the cube structure 102.

Figure 4:
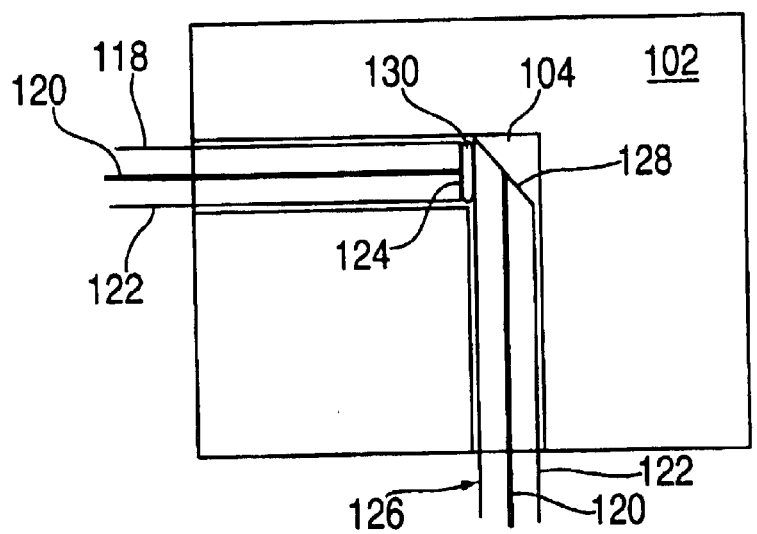
FIG. 4 is a cross-sectional, top view of one of the layers of the laminate assembly, particularly illustrating the individual orthogonal fiber-to-fiber coupling within the V-shaped grooves of the laminate assembly.

Referring now to FIG. 4, there is shown a cross-sectional, top view of one of the layers 106 of the cube structure, particularly illustrating the individual orthogonal fiber-to-fiber coupling within the V-shaped grooves 104 of the cube structure 102. As is shown, a first fiber 118 (including core 120 and cladding 122) has a generally flat, polished endface 124 formed perpendicular to the longitudinal axis of the first fiber 118. However, in order to achieve the orthogonal optical coupling, a second fiber 126 (including core 120 and cladding 122) has an angled endface 128 that is formed by cleaving at substantially a 45° angle. Furthermore, the angled endface 128 is coated with a material (e.g., metal or dielectric) to facilitate optical energy transfer between the first and second fibers 118, 126. Optionally, an index of refraction matching fluid 130 may be inserted within the V-shaped grooves 104 during the manufacturing of the cube structure 102, prior to the stacking of the individual layers 106 thereof. To facilitate even more energy transfer, the first fiber 118 may also be terminated with a rounded tip that acts as an optical lens.

As the fiber ribbon 110 is plugged into the cube structure 102, the individual plug fibers 108 remain essentially straight, cantilevered in free space over a distance of about 10–20 mm from the plug body 112, until making physical contact with the cube structure 102. From the first point of contact between the plug fibers 108 and the backplane cube structure 102, until the plug fibers 108 reach their final position, the tip of each fiber 108 slides down a corresponding V-shaped groove 104 with the forward motion of the plug body. In the case of the plug fibers that are not cleaved, the endfaces thereof are preferably slightly beveled, thereby helping to minimize friction between the fiber 108 and the groove 104 and reduces mechanical wear with repeated insertions.

The contact force between the fiber endface and surface of the V-shaped groove surface is controlled by the bend radius fiber. For most applications, a contact force of about 0.1 N is sufficient for most applications. The angle of the V-shaped groove surfaces is nominally close to about 45° degrees, though some variation is possible for different fiber types.

Figure 5:
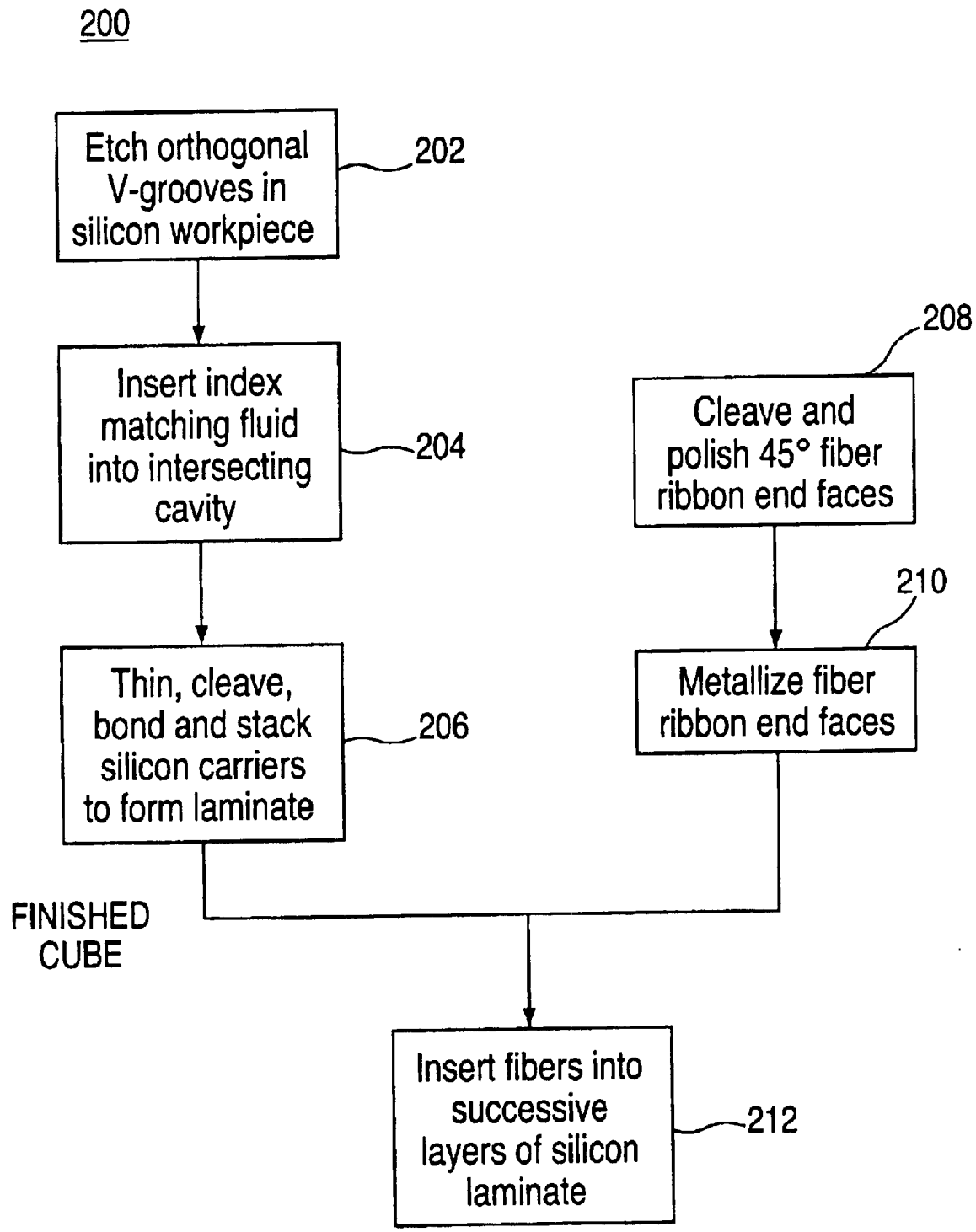
FIG. 5 is a block diagram illustrating an exemplary process flow that may be implemented in fabricating the silicon embodiment of the laminate assembly.

FIG. 5 is a block diagram illustrating an exemplary process flow 200 that may be implemented in the fabrication of the silicon embodiment of the ferrule-less optical fiber connector apparatus 100. As is shown, the process 200 is essentially a parallel process, wherein at block 202, the V-shaped grooves 104 are etched into a silicon workpiece, thereby creating an orthogonal intersection therein. At block 204, the index matching fluid 130 is optionally inserted into the intersecting grooves 104. Next, the silicon is thinned, cleaved, stacked and bonded to form the cube-shaped laminate assembly 102, as shown in block 206. In a parallel fashion, the fiber end faces for the 45° fibers are cleaved and polished, as shown in block 208, and thereafter coated with a reflective material, as shown in block 210. Once both the fiber ribbon 110 and the laminate assemblies 102 are completed, the individual fibers from the ribbon 110 may be inserted into the corresponding grooves 104 of the laminate assembly 102, as shown in block 212.

With conventional connectors, physical contact between the optical media is maintained with a metal spring that typically applies a compressive force of about 4 kg over a relatively high radius of curvature (e.g., 20 mm in diameter). In this manner, the ceramic endfaces of two adjoining connectors are compressed and deformed under a pressure of at least 33 kN/square meter, over a diameter of around 300 microns. This type of contact pressure actually deforms the ceramic ferrule slightly. In contrast, no such high contact forces are required in the ferrule-less connector assembly 100. Rather, a relatively smooth curvature of the fiber provides sufficient contact pressure between the fiber endface and a corresponding V-shaped groove. In addition, a slight residual bowing of the fiber provides a physical contact force between the fibers in the backplane and in the receptacle, as illustrated in FIGS. 8(a) through 8(d). This force is also sufficient to maintain the fiber position in the V-shaped groove without additional mechanical elements.

Although a backplane connector is generally expected to have substantially fewer plug cycles than a conventional optical fiber plug (e.g., no more than perhaps 50 or so in a typical 10-year lifetime), mechanical integrity of the glass fiber is a reliability concern. To address this concern, in a preferred embodiment, a metallized optical fiber is implemented. Such fibers are commercially available from companies such as Fujikura, and feature a coating of about 5–10 microns thick of either gold, aluminum, or other metal compounds. As such, fiber splices may be soldered in place to provide a hermetic seal. Furthermore, the connector apparatus 100 takes advantage of the increased bending strength of the metallized fibers to resist fatigue and microcracks that might otherwise affect the operation of the connector apparatus 100. The metallized coating may either be applied over a standard diameter fiber, or during fiber construction, so that the outer diameter thereof remains about 125±1 micron.

Figure 6:
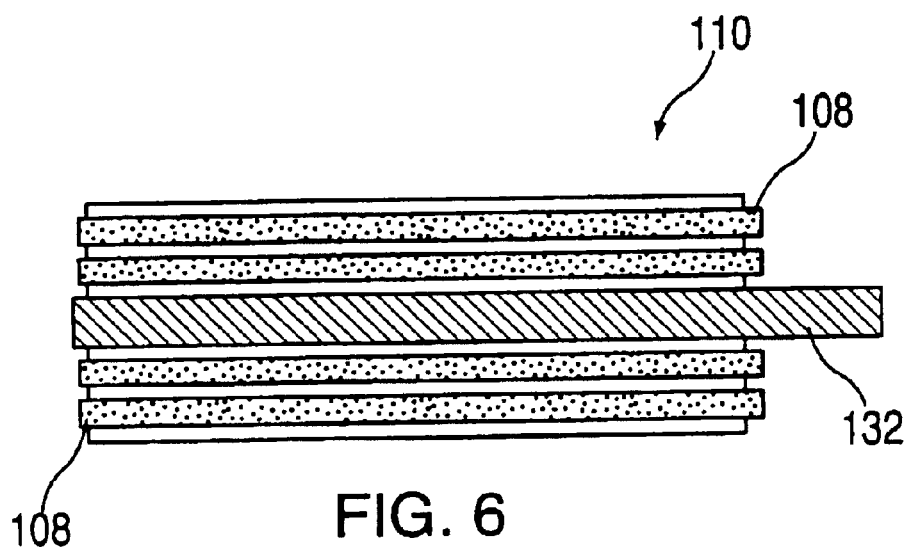
FIG. 6 illustrates a flexible, plastic strength member integrated with a fiber ribbon to provide additional spring force.

As stated earlier, where optical fiber or ribbon fiber is used, physical contact is insured by using the natural resiliency and spring force in the optical fiber. In the particular case of ribbon fiber, a further embodiment in FIG. 6 utilizes a flexible, plastic strength member integrated 132 with the fiber ribbon 110 to provide additional spring force, and may easily be incorporated into the ribbon assembly process after individual fibers are drawn. By assembling the ribbon cable and strength member 132 at the same time as the fiber ribbon is pulled from a fiber drawing tower, the relative alignment of the fibers 108 and strength member 132 is facilitated.

Still an alternative embodiment utilizes a slight angle polish on the plug and receptacle fiber endfaces (e.g., about 7 degrees) to facilitate contact and minimize loss and back reflections. It should also be noted that the cantilevered fibers may be cleaned of dust and dirt prior to insertion by spraying them with an inert, fast evaporating cleaning solution such as hydrofluroether. However, the force of the plugging action is also sufficient to provide self-cleaning of the V-shaped grooves and fiber endfaces, as noted previously.

Although not shown in the Figures, an outer connector body is also preferably provided to protect the fibers or waveguides from mechanical damage or contamination, as well as to provide a latching mechanism (e.g., RJ-45 type latches, push-pull SC latches, etc., known to those skilled in the art) that may or may not require a special plugging tool to engage or disengage the backplane connection.

Figure 7:
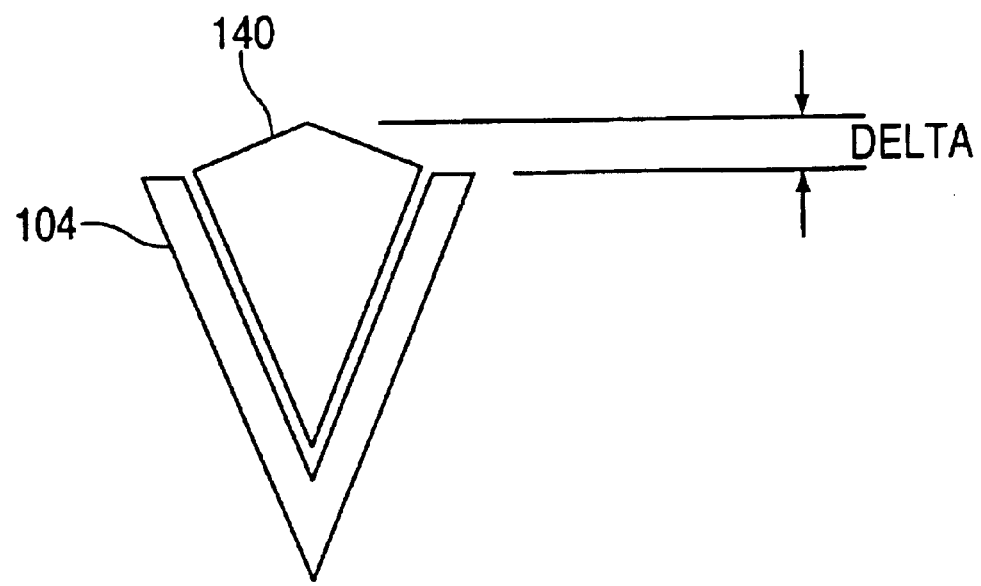
FIG. 7 is a cross-sectional view of an exemplary alternative optical guide that may be used in the connector assembly, in lieu of a fiber.
Figure 8A:
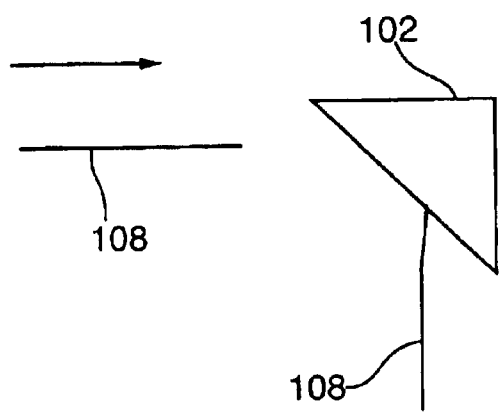
FIGS. 8(a) through 8(d) illustrate the bowed condition of an optical guide upon insertion into the connector assembly.
Figure 8B:
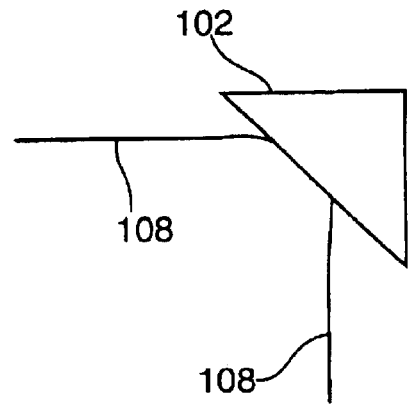
Figure 8C:
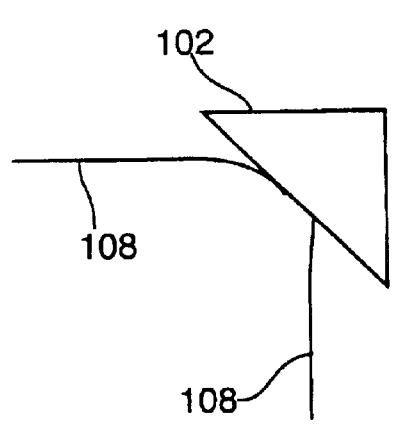
Figure 8D:
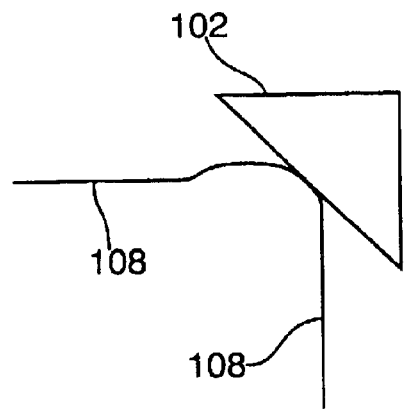

Finally, FIG. 7 is a cross-sectional view of an exemplary alternative optical guide that may be used in the connector assembly 100, in lieu of an fiber. In this example, an asymmetrical waveguide 140 is fabricated so as to conform to the V-shaped grooves 104. In addition, molded or patterned waveguides with rectangular cross-section can be made of doped glass, various polymers, silicon oxynitrides, or other materials, for example. Moreover, such waveguides may exceed over 100 microns in width or height, which well within tolerances for this type of interconnect. Still further embodiments include the extension of the general design to polymer or other types of slab optical waveguides, as well as hybrid schemes which can interface between waveguides and optical fiber. Waveguides can be fabricated with sufficient tolerances to function with this type of interconnect.

As will be appreciated from the above described invention embodiments, the optical connector apparatus 100 does not require ferrules for alignment, but instead implements V-shaped grooves in a plug and receptacle design. The cube-shaped, laminate assembly is configured to receive both optical ribbon fiber (glass or plastic) and/or rectangular waveguides to provide orthogonal optic coupling for large numbers (i.e., arrays) of optical interconnects. Because of the nature of the V-shaped grooves, the cantilevered fibers are guided within the laminate assembly and, at the same time are bent slightly to provide a residual spring force for suitable optical coupling. By using ribbon connectors without ferrules, the connectors become more scalable than other ferrule-based approaches, as larger or stacked ferrules become increasingly difficult to fabricate with adequate tolerances. In contrast, the V-shaped grooves of the present invention embodiments may be scaled to arbitrary size.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A ferrule-less optical backplane connector apparatus, comprising:
    a first optical guide;
    a second optical guide;
    a substrate having at least a pair of optical guide receiving structures formed therein, said pair of optical guide receiving structures being formed at substantially a right angle with respect to one another so as to guide said first and second optical guides into optical alignment with one another; and
    said pair of optical guide receiving structures further being configured to as to receive a cantilevered end of at least one of said first and said second optical guides therein, said cantilevered end being configured in a cantilevered arrangement in free apace with respect to a plug body, said plug body having an opposite end of said at least one of said first and said second optical guides affixed thereto.

2. The ferrule-less optical backplane connector apparatus of claim 1, wherein said pair of optical guide receiving structures further comprises a pair of V-shaped grooves formed in said substrate;
    wherein a first of said pair of said V-shaped grooves receives said first optical guide therein and a second of said pair of said V-shaped grooves receives said second optical guide therein.

3. The ferrule-less, optical backplane connector apparatus of claim 2, wherein:
    one of said first and said second optical guides is terminated at substantially a 45 degree angle.

4. The ferrule-less optical backplane connector apparatus of claim 3, further comprising an index matching fluid deposited within said pair of V-shaped grooves.

5. The ferrule-less optical backplane connector apparatus of claim 2, wherein said substrate further comprises a plurality of stacked lamination layers, with each of said lamination layer having at least a pair of V-shaped grooves formed therein at substantially a right angle with respect to one another.

6. The ferrule-less optical backplane connector apparatus of claim 5, wherein a given pair of V-shaped grooves in one lamination are vertically aligned with a given pair of V-shaped grooves in another lamination layer.

7. The ferrule-less optical backplane connector apparatus of claim 5, wherein said plurality of stacked laminations include V-shaped grooves on top and bottom surfaces thereof so as to create diamond-shaped grooves within middle layers of said substrate.

8. The ferrule-less optical backplane connector apparatus of claim 4, wherein said optical guides comprise optical fibers.

9. The ferrule-less optical backplane connector apparatus of claim 1, wherein said pair of optical guide receiving structures further comprise:
a V-shaped groove formed in said substrate; and
a rectangular slab waveguide formed at substantially a right angle with respect to said V-shaped groove.

10. The ferrule-less optical backplane connector apparatus of claim 1, wherein said substrate is configured to maintain said at least one of said first and said second optical guides in a bowed condition upon insertion therein.

11. The ferrule-less optical backplane connector apparatus of claim 2, wherein said at least one of said first and said second optical guides further comprise an asymmetric, V-shaped waveguide.

12. The ferrule-less optical backplane connector apparatus of claim 10, wherein said bowed condition provides a retention force for retaining said first and second optical guide in optical alignment with one another.

13. A ferrule-less optical backplane connector apparatus, comprising:
a laminate assembly having a plurality of optical guide receiving structures formed within individual layers thereof, said optical guide receiving structures further being formed at substantially right angle pairs with respect to one another; and
each pair of optical guide receiving structures for optically coupling a corresponding pair of optical guides configured within orthogonal sides of said laminate assembly;
wherein said each pair of optical guide receiving structures is further configured so as to receive a cantilevered end of at least one of said corresponding optical guides therein, said cantilevered end being configured in a cantilevered arrangement in free space with respect to a plug body, said plug body having an opposite end of said at least one of said corresponding optical guides affixed thereto.

14. The apparatus of claim 13, wherein each pair of optical guide receiving structures further comprises:
a pair of V-shaped grooves formed within individual layers of said laminate assembly, with each pair of V-shaped grooves for guiding and optically coupling a corresponding pair of optical guides inserted within orthogonal sides of said laminate assembly.

15. The apparatus of claim 14, wherein said V-shaped grooves are vertically aligned with respect to said individual layers so as to accommodate an array of optical guides therein.

16. The apparatus of claim 15, wherein:
said array of optical guides further comprises an optical fiber ribbon having individual fibers cantilevered at one end thereof;
said one end of said individual fibers is inserted into a corresponding V-shaped groove; and
an opposite end of said individual fibers is affixed to said plug body.

17. The apparatus of claim 16, wherein said pairs V-shaped grooves are configured so as to accommodate a plurality of optical fiber ribbon arrays plugged into orthogonal sides of said laminate assembly.

18. The apparatus of claim 14, wherein one of said pair of corresponding optical guides further comprises an optical fiber ribbon having individual fibers terminated at a substantially 45 degree angle thereof.

19. The apparatus of claim 17, wherein said individual fibers are configured with a reflective finish at the terminated ends thereof.

20. The apparatus of claim 14, further comprising an index matching fluid deposited within each said pair of V-shaped grooves.

21. The apparatus of claim 14, wherein said individual layers of said laminate assembly include V-shaped grooves on top and bottom surfaces thereof so as to create diamond-shaped grooves within middle layers of said laminate assembly.

22. The apparatus of claim 13, wherein each said pair of optical guide receiving structures further comprises:
a V-shaped groove formed in said laminate assembly; and
a rectangular slab waveguide formed at substantially a right angle with respect to said V-shaped groove.

23. The apparatus of claim 13, wherein said laminate assembly is configured to maintain said at least one of said optical guides in a bowed condition upon insertion herein.

24. The apparatus of claim 14, wherein each said pair of guides further comprises an asymmetric, V-shaped waveguide.

25. The apparatus of claim 18, wherein said optical fiber ribbon further comprises a flexible strength member integrated therewith.

26. The apparatus of claim 23, wherein said bowed condition provides a retention force for retaining said first and second optical guides in optical alignment with one another.

27. A method for forming a ferrule-less optical backplane connector assembly, the method comprising:
forming orthogonally intersecting pairs of V-shaped grooves within a plurality of workpieces;
inserting an index-matching fluid within each pair of said V-shaped grooves; and
stacking and bonding each of said plurality of workpieces to form a generally cube-shaped, laminate assembly;
wherein said pairs of V-shaped grooves in individual layers of said laminate assembly are vertically aligned so as to receive arrays of optical guides within orthogonal sides of said assembly, and wherein said pairs of V-shaped grooves are further configured so as to receive a cantilevered end of said arrays of optical guides therein, said cantilevered end being configured in a cantilevered arrangement in free space with respect to a plug body, said plug body having an opposite end of said at least one of said first and said second optical guides affixed thereto.

* * * * *